(12) United States Patent
Gopalakrishnan

(10) Patent No.: US 10,824,933 B2
(45) Date of Patent: Nov. 3, 2020

(54) METHOD AND SYSTEM FOR UNBIASED EXECUTION OF TASKS USING NEURAL RESPONSE ANALYSIS OF USERS

(71) Applicant: WIPRO LIMITED, Bangalore (IN)

(72) Inventor: Subramonian Gopalakrishnan, Ernakulam (IN)

(73) Assignee: Wipro Limited, Bangalore (IN)

( * ) Notice: Subject to any disclaimer, the term of this patent is extended or adjusted under 35 U.S.C. 154(b) by 683 days.

(21) Appl. No.: 15/690,654

(22) Filed: Aug. 30, 2017

(65) Prior Publication Data

US 2019/0019079 A1 Jan. 17, 2019

(30) Foreign Application Priority Data

Jul. 12, 2017 (IN) .............................. 201741024658

(51) Int. Cl.
*G06N 3/02* (2006.01)
*G06N 20/00* (2019.01)

(52) U.S. Cl.
CPC ............... *G06N 3/02* (2013.01); *G06N 20/00* (2019.01)

(58) Field of Classification Search
CPC .............. A61N 1/0529; G01R 33/4806; G06F 2203/011
USPC ..................................................... 706/15, 45
See application file for complete search history.

(56) References Cited

U.S. PATENT DOCUMENTS

| | | |
|---|---|---|
| 8,392,250 B2 | 3/2013 | Pradeep et al. |
| 8,442,849 B2 | 5/2013 | Kantak et al. |
| 9,449,287 B2 | 9/2016 | Gunjan |
| 2011/0085700 A1 | 4/2011 | Lee |
| 2012/0296569 A1* | 11/2012 | Shahaf ................. A61B 5/4064 702/19 |
| 2017/0202518 A1* | 7/2017 | Furman ............. G01R 33/4806 |
| 2018/0240157 A1* | 8/2018 | Gopalakrishnan .......................... G06Q 30/0269 |

OTHER PUBLICATIONS

Seo et al., Neural Dust: An Ultrasonic, Low Power Solution for Chronic Brain Machine Interfaces, Department of Electrical Engineering and Computer Sciences and yHelen Wills Neuroscience Institute, University of California, Berkeley, CA, USA, 2013, pp. 1-11 (Year: 2013).*

* cited by examiner

*Primary Examiner* — David R Vincent

(74) *Attorney, Agent, or Firm* — Finnegan, Henderson, Farabow, Garrett & Dunner, LLP

(57) ABSTRACT

The present disclosure relates to method and system for unbiased execution of tasks using neural response analysis of users by neural response analysis system. The neural response analysis system comprises providing one or more predefined neural stimulus, to plurality of users, receive neural responses from plurality of users in view of one or more predefined neural stimulus, correlate one or more neural responses of plurality of users with corresponding data associated with each of plurality of users stored in stimulus response mapping database to create logical matrix indicative of one or more solution parameters for resolving task, create solution model to resolve task based on logical matrix, where solution model eliminates biases and preferences of plurality of users determined based on correlation.

30 Claims, 6 Drawing Sheets

METHOD AND SYSTEM FOR UNBIASED EXECUTION OF TASKS USING NEURAL RESPONSE ANALYSIS OF USERS

TECHNICAL FIELD

The present subject matter is related in general to the field of neural response analysis, more particularly, but not exclusively to a method and system for unbiased execution of tasks using neural response analysis of users.

BACKGROUND

With fast growing technology, the interactions between human and man-made machines have gained huge importance for efficient execution of human intended operations on the machine. However, a comparison between computers and human has been going on for a very long time involving many researches on efficient interface mechanisms to efficiently utilize the man-made machines. Meanwhile, the human brains are often criticized of being analogue compared to the computer which is digital and superior. But in reality, the mane-made computers are far inferior to the brain. The computers are faster than an average human brain when it comes to executing simple step-by-step instructions. But when a computer has to stand against the complete set of activities that human mind is capable of doing independently, then the human brain is superior in several aspects and powerful than computers at tasks that cannot be easily broken into simple steps. These includes complex pattern recognition, language abilities, situational analysis, emotional and creative thinking and the like. Though the human brains are superior, identifying appropriate users or people towards solving a specific problem, collaboration is very difficult due to lack of sharing common information between each other and biases and preferences of the users.

The existing technology uses human activity/behavioural information available on different sources like social activities, online content, personal preferences to gather appropriate users for specific activity. For instance, activities such as, conventional planning and labour intrinsic tasks in product design, space research, traffic management, crime detection, scientific experiments and the like require unique analytical, logical, visual and psychological skills of human brain. Some of these tasks may be automated and some other tasks that are conventionally impossible can be attempted by virtue of collaboration. However, the existing techniques fail to efficiently identify appropriate user due to the inaccuracies in available information and the information provided by any individual is situational. Also, the existing techniques do not remove any biases and preferences of the users in resolving tasks.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a method for unbiased execution of tasks using neural response analysis of users. The method may comprise providing One or more predefined neural stimulus to a plurality of users. The one or more predefined neural stimulus is associated with a task to be assigned and resolved by the plurality of users. The method comprises receiving one or more neural responses from the plurality of users in view of the one or more predefined neural stimulus. The neural dust sensors placed on each of the plurality of users detect the one or more neural responses. The method comprises correlating the one or more neural responses of the plurality of users with corresponding data associated with each of the plurality of users stored in a stimulus response mapping database to create a logical matrix indicative of one or more solution parameters for resolving the task, creating a solution model to resolve the task based on the logical matrix. The solution model eliminates biases and preferences of the plurality of users determined based on the correlation.

In an embodiment, the present disclosure relates to a neural response analysis system for unbiased execution of tasks using neural response analysis of users. The neural response analysis system comprises a processor and a memory communicatively coupled to the processor, where the memory stores processor executable instructions, which, on execution, may cause the neural response analysis system to provide one or more predefined neural stimulus to a plurality of users. The one or more predefined neural stimulus is associated with a task to be assigned and resolved by the plurality of users. The neural response analysis system receives one or more neural responses from the plurality of users in view of the one or more predefined neural stimulus. The neural dust sensors placed on each of the plurality of users detect the one or more neural responses. The neural response analysis system correlates the one or more neural responses of the plurality of users with corresponding data associated with each of the plurality of users stored in a stimulus response mapping database to create a logical matrix indicative of one or more solution parameters for resolving the task, create a solution model to resolve the task based on the logical matrix. The solution model eliminates biases and preferences of the plurality of users determined based on the correlation.

In an embodiment, the present disclosure relates to a non-transitory computer readable medium including instructions stored thereon that when processed by at least one processor may cause a neural response analysis system to provide one or more predefined neural stimulus to a plurality of users. The one or more predefined neural stimulus is associated with a task to be assigned and resolved by the plurality of users. The instruction causes the processor to receive one or more neural responses from the plurality of users in view of the one or more predefined neural stimulus. The neural dust sensors placed on each of the plurality of users detect the one or more neural responses, The instruction causes the processor to correlate the one or more neural responses of the plurality of users with corresponding data associated with each of the plurality of users stored in a stimulus response mapping database to create a logical matrix indicative of one or more solution parameters for resolving the task, create a solution model to resolve the task based on the logical matrix. The solution model eliminates biases and preferences of the plurality of users determined based on the correlation.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
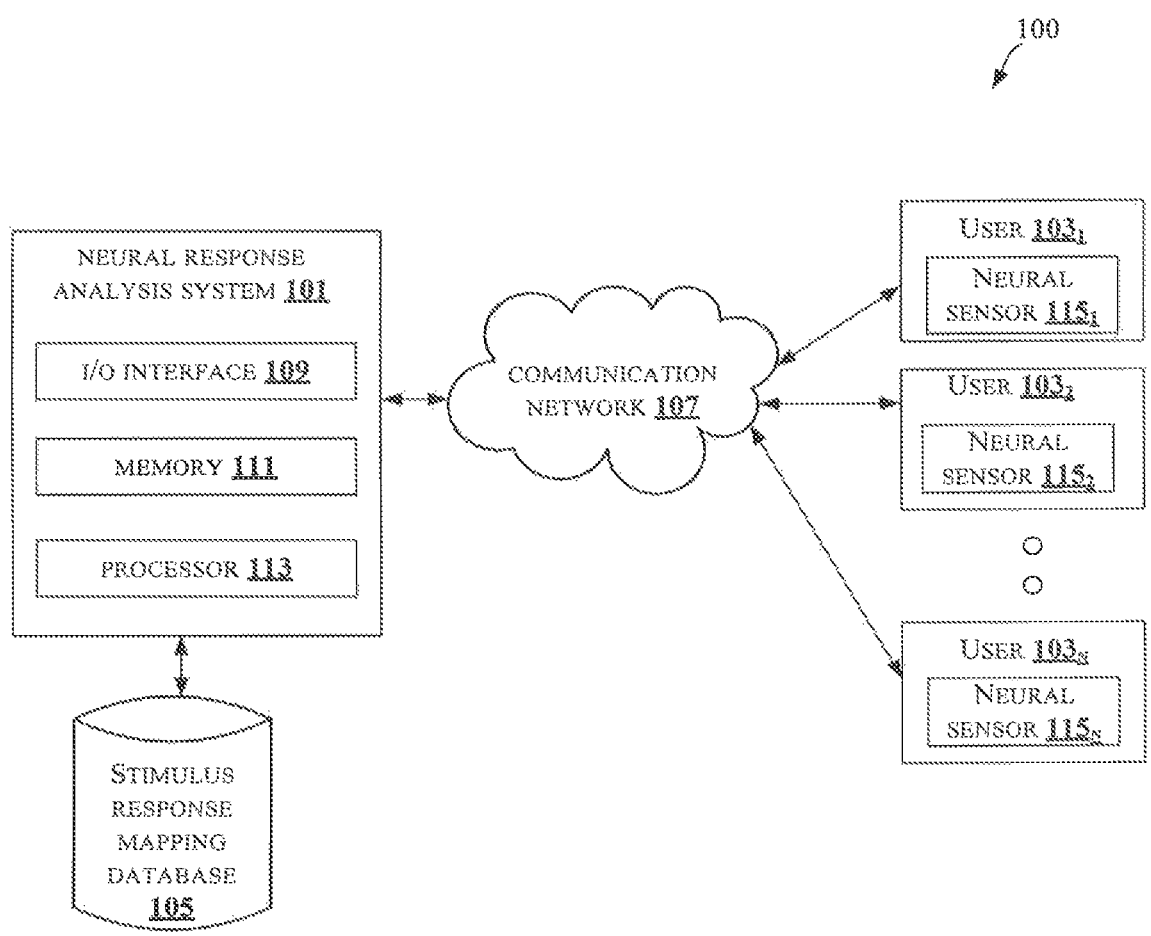
FIG. 1 illustrates an exemplary environment for unbiased execution of tasks using neural response analysis of users in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to a method and a neural response analysis system for unbiased execution of tasks using neural response analysis of users. In an embodiment, the unbiased execution may refer to fair and impartial response of the users for executing the tasks. Initially, the neural response analysis system is trained with biases and preferences of the users. At a training phase, the neural response analysis system may subject a plurality of users to plurality of neural stimulus for identifying the biases and preferences of the plurality of users. In an embodiment, the plurality of neural stimulus may be related to tasks which may be performed by the plurality of users. The identified biases and preferences of the plurality of users are stored in a stimulus response mapping database.

Whenever a set of users are required for an execution of a task in real-time, the neural response analysis system may provide one or more predefined neural stimulus to the plurality of users. The one or more predefined neural stimulus may be associated with the task which may be assigned to the plurality of users. In view of the one or more neural stimulus, one or more neural responses from the plurality of users may be received. In an embodiment, neural dust sensors placed on the plurality of users detect presence of the one or more neural responses. The one or more neural responses may be correlated with biases and preferences associated with each of the plurality of users stored in the stimulus response mapping database. Based on the correlation, a logical matrix may be created which may include one or more solution parameters for resolving the task. In an embodiment, the one or more solution parameters may include approach to the task, options considered, personal biases, cognitive style, and sensitivity to the predefined neural stimulus. The neural response analysis system may create a solution model to resolve the task based on the logical matrix. In an embodiment, the solution model may eliminate biases and preferences of the plurality of users determined based on the correlation. In an embodiment, the neural response analysis system may generate one or more instructions for unbiased execution of the tasks based on the solution model.

FIG. 1 illustrates an exemplary environment for unbiased execution of tasks using neural response analysis of users in accordance with some embodiments of the present disclosure.

As shown in FIG. 1, the environment 100 includes a neural response analysis system 101 connected through a communication network 107 to a user $103_1$, a user $103_2$ . . . and a user $103_N$ (collectively referred as plurality of users 103). The user $103_1$ may be equipped with a neural sensor $115_1$. Similarly, the user $103_2$ . . . user $103_N$ are equipped with respective neural sensor. In an embodiment, the neural sensor $115_1$, . . . , neural sensor $115_N$ are collectively referred as neural sensors 115. A person skilled in the art would understand that a plurality of neural sensors 115 may be placed on the plurality of users 103. The communication network 107 may include, but is not limited to, a direct interconnection, an e-commerce network, a Peer to Peer (P2P) network, Local Area Network (LAN), Wide Area Network (WAN), wireless network (e.g., using Wireless Application Protocol), Internet, Wi-Fi and the like. The neural response analysis system 101 is connected to a stimulus response mapping database 105. The neural response analysis system 101 may generate a solution model to resolve tasks by users without any biases and preferences. In an embodiment, the neural response analysis system 101 may include, but is not limited to, a laptop, a desktop computer, a Personal Digital Assistant (PDA), a notebook, a smartphone, tablet, a server and any other computing devices. A person skilled in the art would understand that, any other devices, not mentioned explicitly, may also be used in the present disclosure.

Initially, the neural response analysis system 101 may be trained to identify biases and preferences of the plurality of users 103. During the training phase, the neural response analysis system 101 may subject each of the plurality of users 103 to a plurality of neural stimulus for identifying biases and preferences of each of the plurality of users 103. The neural response analysis system 101 stores the biases and preferences identified for each of the plurality of users 103 in the stimulus response mapping database 105.

Further, at a later point of time, when a set of users may be required for an assignment, the neural response analysis system 101 may provide one or more predefined neural stimulus to a plurality of users 103. The one or more predefined neural stimulus may be associated with the tasks within the assignment to be resolved by the plurality of users 103. In an embodiment, the one or more predefined neural stimulus comprises stimulus presented in form of situations, visual puzzles, mathematical problems and raw data. In an embodiment, the stimulus may be presented, but not limited to, audio form or video form or a combination thereof. A person skilled in the art would understand that any other form of stimulus, not mentioned explicitly may also be provided to the plurality of users 103 in the present disclosure. In an embodiment, the one or more predefined neural stimulus provided to the plurality of users 103 may be selected by self-learning based on the training phase, such that, the displayed one or more predefined neural stimulus may not invoke biases of the plurality of users 103. Further, the neural sensors 115 placed on each of the plurality of users 103 may be used for detecting one or more neural responses of the plurality of users 103. In an embodiment, the neural sensors 115 may comprise neural dust sensor. A person skilled in the art would understand that any other sensor not mentioned explicitly may also be used for detecting the one or more neural responses of the plurality of users 103 in present disclosure. In view of the one or more predefined neural stimulus, the neural response analysis system 101 may receive the one or more neural responses of the plurality of users 103. Further, the neural response analysis system 101 may correlate the one or more neural responses of the plurality of users 103 with corresponding data associated with each of the plurality of users 103 which is stored in the stimulus response mapping database 105. In an embodiment, the correlating may be identified by performing psychometric analysis and personal trait mapping of the plurality of users 103 based on social media behavior of the plurality of users 103. In an embodiment, the social media data associated with each of the plurality of users 103 may be stored in the stimulus response mapping database 105. Based on the correlation, the neural response analysis system 101 may create a logical matrix which comprises one or more solution parameters for resolving the task. In an embodiment, the one or more solution parameters comprises approach to the task, options considered, personal biases, cognitive style, and sensitivity to the predefined neural stimulus. A person skilled in the art would understand that any other solution parameters, not mentioned explicitly may also be used in the present disclosure. Further, based on the logical matrix, the neural response analysis system 101 may create a solution model for resolving the task. In an embodiment, the solution model may eliminate biases and preferences of the plurality of users 103 determined based on the correlation. In an embodiment, biases may refer to an inclination or outlook of a person to hold a partial perspective towards a situation. That is, biases may be a pattern of deviation from standards in judgment, whereby inferences may be created unreasonably leading to inaccurate judgement. For example, biases and preferences may be based on social, culture, habitual and the like belief of the person. In an embodiment, the solution model may comprise eliminating one or more neural responses associated with the one or more predefined neural stimulus, that are mapped to bias and preference information associated with the plurality of users 103. In an embodiment, the neural response analysis system 101 may create one or more instructions for unbiased execution of the task based on the solution model.

In an embodiment, the neural response analysis system 101 may classify user profiles in the stimulus response mapping database 105 based on patterns of behavior of each of the plurality of users 103.

The neural response analysis system 101 includes an I/O Interface 109, a memory 111 and a processor 113. The I/O interface 109 may be configured to receive one or more predefined neural stimulus and data associated with the plurality of users 103 from the stimulus response mapping database 105. The I/O interface 109 may also receive the one or more neural responses from the plurality of users 103.

The received information from the I/O interfaces 109 may be stored in the memory 111. The memory 111 is communicatively coupled to the processor 113 of the neural response analysis system 101. The memory 111 may also store processor instructions which may cause the processor 113 to execute the instructions for unbiased execution of tasks using neural response analysis of users.

Figure 2:
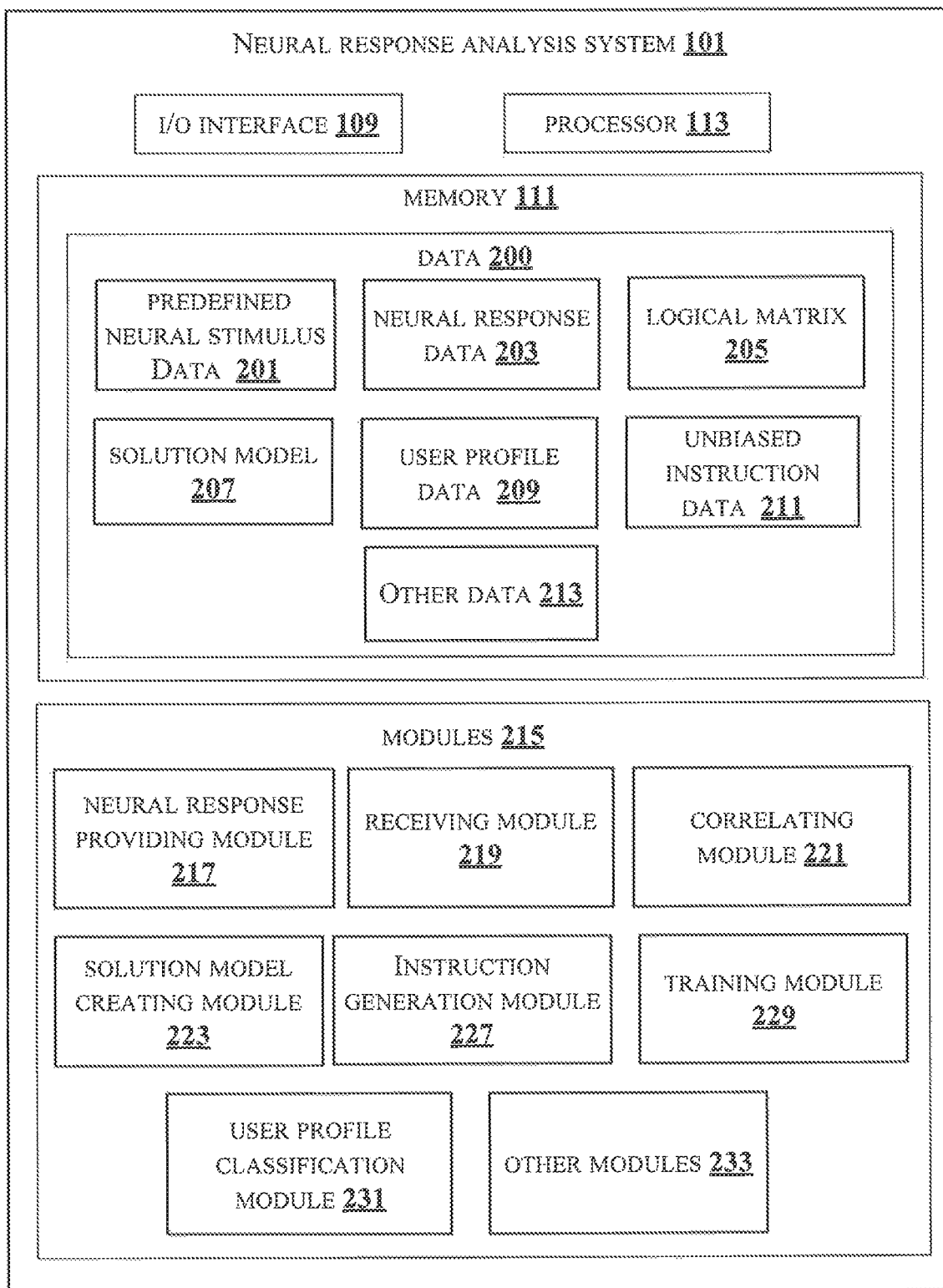
FIG. 2 shows a detailed block diagram of a neural response analysis system in accordance with some embodiments of the present disclosure.

FIG. 2 shows a detailed block diagram of a neural response analysis system in accordance with some embodiments of the present disclosure.

Data 200 and one or more modules 215 of the neural response analysis system 101 are described herein in detail. In an embodiment, the data 200 includes predefined neural stimulus data 201, neural response data 203, logical matrix 205, solution model 207, user profile data 209, unbiased instruction data 211 and other data 213.

The predefined neural stimulus data 201 may include a plurality of neural stimulus associated with the task to be resolved by the plurality of users 103. The plurality of users 103 may be provided with one or more predefined neural stimulus which are selected based on the training phase. In an embodiment, the plurality of neural stimulus is created to encapsulate the task to be resolved. In an embodiment, the one or more predefined neural stimulus may comprise stimulus presented in form of situations, visual puzzles, mathematical problems and raw data. In an embodiment, the stimulus may be presented to the plurality of users 103 in audio and visual form. A person skilled in the art would understand that any other form of stimulus, not mentioned explicitly, may also be used in the present disclosure. For example, if the task is associated with crime investigation, the one or more predefined neural stimulus may be in form of audio and video of crime location, visual images captured or modified based on data insights flashed such as to solve a jig saw puzzle and the like.

The neural response data 203 may include one or more neural responses of the plurality of users 103 received in view of the one or more predefined neural stimulus. In an embodiment, the neural dust sensors detect the one or more neural responses of the plurality of users 103. In an embodiment, the one or more neural responses from the plurality of users 103 may be in the form of logical impulses. For example, the logical impulses could be against a jumbled data population, array, visuals, sounds and the like.

The logical matrix 205 may include one or more solution parameters for resolving the task. The logical matrix 205 may be created based on correlation of the one or more neural responses of the plurality of users 103 with corresponding data of each of the plurality of users 103 stored in the stimulus response mapping database 105. In an embodiment, the data of each of the plurality of users 103 may include the biases and preferences identified for each of the plurality of users 103. In an embodiment, the one or more solution parameters may include approach to the task, options considered, personal biases, cognitive style, and sensitivity to the predefined neural stimulus.

The solution model 207 may include a model for resolving the task. The solution model may be created based on the logical matrix 205. The solution model 207 may include eliminating one or more neural responses associated with the one or more predefined neural stimulus, which are mapped to bias and preference information associated with the plurality of users 103.

The user profile data 209 may include details of each of the plurality of users 103. The details may include user skills, constraints and preferences from various historical user interaction details. In an embodiment, the user profile may be build based on plurality of sources such as, user preferences, recommendations, affiliations, accomplishments, social media details and the like. In an embodiment, the plurality of users 103 at the time of training phase may be subjected to the plurality of neural stimulus to identify preferences and biases. The biases and preferences of each of the plurality of users 103 may be archived against respective user profiles.

The unbiased instruction data 211 may include one or more instructions generated for unbiased execution of the tasks based on the solution model.

The other data 213 may store data, including temporary data and temporary files, generated by modules 215 for performing the various functions of the neural response analysis system 101.

In an embodiment, the data 200 in the memory 111 are processed by the one or more modules 215 of the neural response analysis system 101. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The said modules 215 when configured with the functionality defined in the present disclosure will result in a novel hardware.

In one implementation, the one or more modules 215 may include, but are not limited to a neural stimulus providing module 217, a receiving module 219, a correlating module 221, a solution model creating module 223, an instruction generation module 227, a training module 229 and a user profile classification module 231. The one or more modules 215 may also comprise other modules 233 to perform various miscellaneous functionalities of the neural response analysis system 101. It will be appreciated that such modules 215 may be represented as a single module or a combination of different modules 215.

The neural stimulus providing module 217 may provide one or more predefined neural stimulus to the plurality of users 103. The one or more predefined neural stimulus is associated with the task to be resolved by the plurality of users 103. In an embodiment, the one or more predefined neural stimulus may be provided based on self-learning during the training phase, such that, the displayed one or more predefined neural stimulus may not invoke biases of the plurality of users 103. The displayed one or more predefined neural stimulus may not invoke biases of the plurality of user 103. In an embodiment, the one or more predefined neural stimulus may include, but not limited to, audio-visual stimulus presented in form of situations, visual puzzles, mathematical problems and raw data for pattern recognition and the like. In an embodiment, the one or more predefined neural stimulus may be created and stored in the predefined neural stimulus 201. In an embodiment, the one or more predefined neural stimulus helps in identifying patterns used by the plurality of users 103 while resolving the task.

The receiving module 219 may receive the one or more neural responses from the plurality of users 103 in view of the one or more predefined neural stimulus. In an embodiment, the neural dust sensors placed on the plurality of users 103 may detect the presence of one or more neural responses. In an embodiment, the neural dust sensors may be injected into body of the plurality of users 103. In an embodiment, the plurality of users 103 may also be exposed to other sensors such as, electro encephalography, electro oculography, electro dermal activity implants. In an embodiment, the neural dust sensors may be infested into various parts of the body of the plurality of users 103 to accurately sense deep nerve signals from nervous system. Each neural dust sensor possesses a piezoelectric crystal which may convert mechanical power from ultrasonic pulses broadcast from outside the body into electrical power. In an embodiment, each neural dust sensor may include three main parts namely, a pair of electrodes to measure nerve signals, a custom transistor to amplify the signal and a piezoelectric crystal which may serve as dual purpose of converting the mechanical power of externally generated ultrasound waves into electrical power and communicating the recorded nerve activity. The neural dust sensor may also include an external transceiver board which uses ultrasound to power and communicate with the sensors by emitting pulses of ultrasonic energy and listening for reflected pulses. In an embodiment, the one or more neural responses may be in the form of the logical impulses. For example, the logical impulses may be for the jumbled data population, array, visuals, sounds and the like. The receiving module 219 may also receive the data associated with each of the plurality of users 103 from the stimulus response mapping database 105.

The correlating module 221 may correlate the one or more neural responses of the plurality of users 103 with the corresponding data of each of the plurality of users 103 stored in the stimulus response mapping database 105. In an embodiment, the correlation may include performing psychometric analysis and personal trait mapping of the plurality of users 103 based on social media behavior of the plurality of users 103. For example, personality trait analysis for the plurality of users 103 is configured to match the unique skills and constraints of the plurality of users 103 based on the social media data. In the psychometric analysis, for example, the one or more neural responses of the plurality of users 103 are analysed based on pattern of response to similar posts, similarity or difference in response to various profiles based on relationship such as friends, family, general acquaintance, friend's friend and the like, time taken to respond, hibernation period, response to conflicts and the like rather than direct emotional expressions such as, "likes", "comments", "emoticons", "memes" and the like. Based on the correlation, the correlating module 221 may create the logical matrix 205 which comprises one or more solution parameters for resolving the task. In an embodiment, the one or more solution parameters comprises approach to the task, options considered, personal biases, cognitive style, and sensitivity to the predefined neural stimulus.

The solution model creating module 223 may create the solution model for resolving the task based on the logical matrix 205. In an embodiment, the solution model 207 may eliminate the biases and preferences of the plurality of users 103 identified during correlation. In an embodiment, the solution model 207 may include eliminating one or more neural responses associated with the one or more predefined neural stimulus, that are mapped to bias and preference information associated with the plurality of users 103.

The instruction generation module 227 may generate one or more instructions for unbiased execution of tasks associated with the plurality of users based on the solution model 207. In an embodiment, the solution model may lead to instructions, campaigns, activities and the like.

The training module 229 may train the stimulus response mapping database 105 with biases and preferences of the plurality of users 103. The training module 229 may subject each of the plurality of users 103 to the plurality of neural stimulus during to identify biases and preferences of each of the plurality of users 103.

The user profile classification module 231 may classify the plurality of users 103 based on patterns of behavior of each of the plurality of users 103. The user profile classification module 231 may determine specific user skills, constraints, biases and preferences from the plurality of historical user interactions data. The user profile may be built based on the plurality of sources including, but not limited to, recommendations, affiliations/associations, accomplishments, social media data and other historic details.

Figure 3:
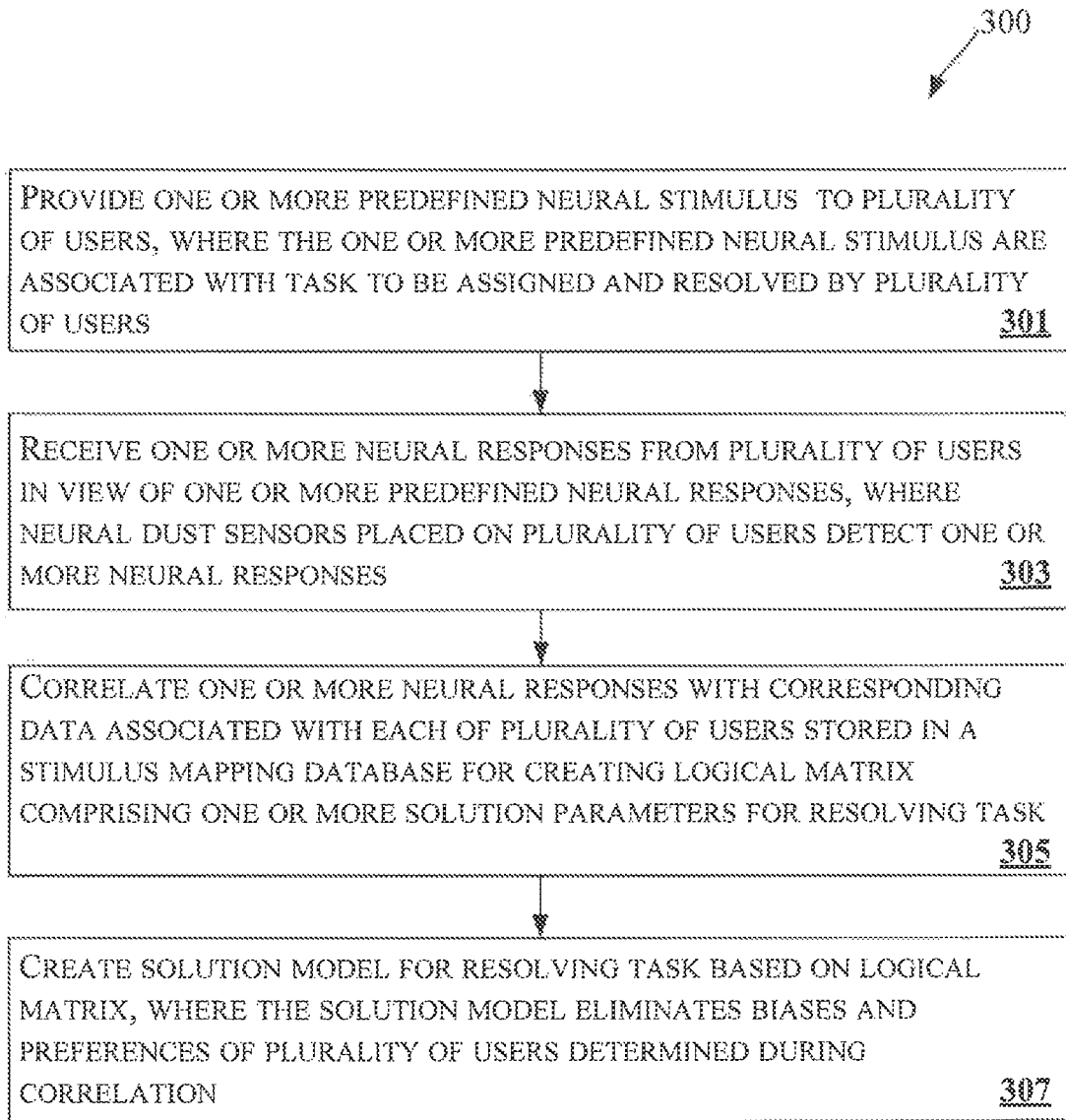
FIG. 3 illustrates a flowchart showing a method for unbiased execution of tasks using neural response analysis of users in accordance with some embodiments of present disclosure.

FIG. 3 illustrates a flowchart showing a method for unbiased execution of tasks using neural response analysis of users in accordance with some embodiments of present disclosure.

As illustrated in FIG. 3, the method 300 includes one or more blocks for unbiased execution of tasks using neural response analysis of users. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, providing, by the neural stimulus providing module 217, the one or more predefined neural stimulus to the plurality of users 103. The one or more predefined neural stimulus may be associated with the task to be assigned and resolved by the plurality of users 103.

At block 303, receiving, by the receiving module 219, the one or more neural responses from the plurality of users 103 in view of the one or more predefined neural stimulus. In an embodiment, the neural dust sensors placed on each of the plurality of users 103 detect the one or more neural responses.

At block 305, correlating, by the correlating module 221, the one or more neural responses of the plurality of users 103 with corresponding data associated with each of the plurality of users 103 stored in the stimulus response mapping database 105 to create a logical matrix 205 comprising of one or more solution parameters for resolving the task.

At block 307, creating, by the solution model creating module 223, the solution model 207 to resolve the task based on the logical matrix 205. In an embodiment, the solution model may eliminate the biases and the preferences of the plurality of users 103 determined based on the correlation.

Figure 4A:
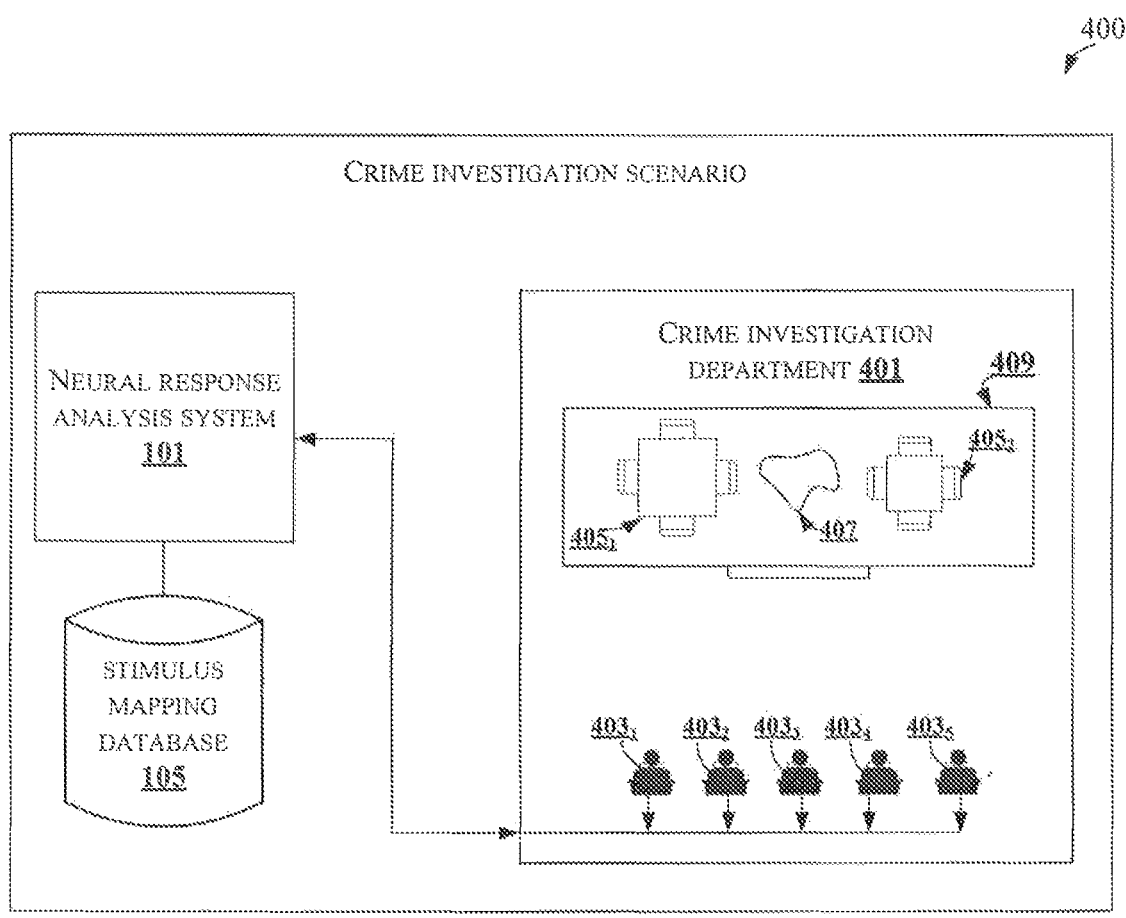
FIG. 4a shows an exemplary representation of a crime investigation scenario for unbiased execution of the investigation using neural response analysis of users in accordance with some embodiments of the present disclosure.

FIG. 4a shows an exemplary representation of a crime investigation scenario for unbiased execution of the investigation using neural response analysis of users in accordance with some embodiments of the present disclosure.

As shown in FIG. 4a, the environment 400 illustrates a scenario of crime investigation in an exemplary embodiment of the present disclosure. The environment 400 includes a crime investigation department 401. The crime investigation department 401 includes five users, a user $403_1$, a user $403_2$, ... and a user $403_5$ (collectively referred as plurality of users 403), having talents in various facets such as, investigation, artists, sound engineers, mathematicians, forensic experts, designers and the like. A person skilled in the art would understand that FIG. 4a is an exemplary embodiment, and the present disclosure may comprise plurality of users. In an embodiment, the neural dust sensors are placed on the user $403_1$, ... user $403_5$ (not shown explicitly). A person skilled in the art would understand that any other sensor may also be used in the present disclosure. Further, the crime investigation department 401 comprises a display system 409. In an embodiment, the display system 409 may comprises audio and video facilities. The environment 400 also comprises the neural response analysis system 101 connected to the plurality of users 403 and the stimulus response mapping database 105. In an embodiment, the plurality of users 403 may be connected through the communication network (not shown in FIG. 4a) to the neural response analysis system 101. Initially, the neural response analysis system 101 may provide one or more predefined neural stimulus to the plurality of users 403. The one or more predefined neural stimulus is displayed to the plurality of users 403 on the display system 409 as shown in FIG. 4a. For example, the neural stimulus is a video associated with a scene is a restaurant. As shown in the display system 409, the restaurant comprises two tables $405_1$ and table $405_2$ and a spot of red colour 407. The plurality of users 403 may view the video stimulus as shown in FIG. 4a. Based on the video stimulus, the neural dust sensors placed on the plurality of users 403 may detect the one or more neural responses of each of the plurality of users 403. The one or more neural responses from the plurality of users 403 are received by the neural response analysis system 101 and correlated with data of each of the plurality of users 403 stored in the stimulus response mapping database 105. Based on the correlation, the neural response analysis system 101 may create a logical matrix 205 which may include one or more solution parameters for resolving the crime investigation. In an embodiment, the one or more solution parameters includes approach to the task, options considered, personal biases, cognitive style, and sensitivity to the predefined neural stimulus considered by the plurality of users 403. For example, a user may be biased when the user suspects a person based on race, place of origin, way of talking, dressing style, sex of the person and the like. Based on the logical matrix 205, the neural response analysis system 101 may create a solution model for resolving the task. The solution model eliminates the biases and preferences of the plurality of users 403 which may be identified during correlation. For example, based on the correlation, the neural response analysis system 101 identifies that the user 403$_1$ is biased based on the sex of the suspect. In such case, the solution model may be built by removing the bias on the sex of the suspect. Further, the neural response analysis system 101 may generate the one or more instructions for unbiased execution of the crime investigation by the user 403$_1$ based on the solution model. For example, the one or more instructions may include masking the sex of the suspect from the user and providing information like attributes, motives, circumstances, evidences and the like.

Similarly, in other scenarios such as, scientific research work may also be considered in the present embodiment. The scenario may consider users such as, astronaut, nuclear, quantum or optical physicist, mathematician, engineer, designers and the like. During the training phase, the neural response analysis system 101 may provide the one or more stimulus associated with the work of the users in the scientific research work. Based on the response of the users, one or more biases and preferences of the users may be identified and stored in the stimulus response mapping database 105. Further, in real-time, for executing any scientific work, the neural response analysis system 101 may provide the one or more predefined neural stimulus to the users and correlate the neural responses of the users with the biases and preferences stored on the stimulus response mapping database 105. Based on the correlation, the neural response analysis system 101 may create a logical matrix which may include one or more solution parameters for performing the scientific research work. In an embodiment, the one or more solution parameters includes approach to the task, options considered, personal biases, cognitive style and sensitivity to the one or more predefined neural stimulus. For example, a user in the present scenario may be biased towards a theory of mathematics, quantum theory, based on particular design, biased towards a particular scientist and the like. Based on the logical matrix, the neural response analysis system 101 may create a solution model for performing the scientific research work without any bias and preferences. The solution model eliminates the biases and preferences of the users which may be identified during correlation. For example, based on the correlation, the neural response analysis system 101 identifies that quantum physicist may be biased towards a theory of quantum. In such case, the solution model may be built by removing the bias which is towards the theory of quantum. Further, the neural response analysis system 101 may generate the one or more instructions for unbiased execution of the scientific research work based on the solution model. For example, the one or more instructions may include presenting the theory or data to the quantum physicist which may not show that the theory is specific to a topic of quantum.

Figure 4B:
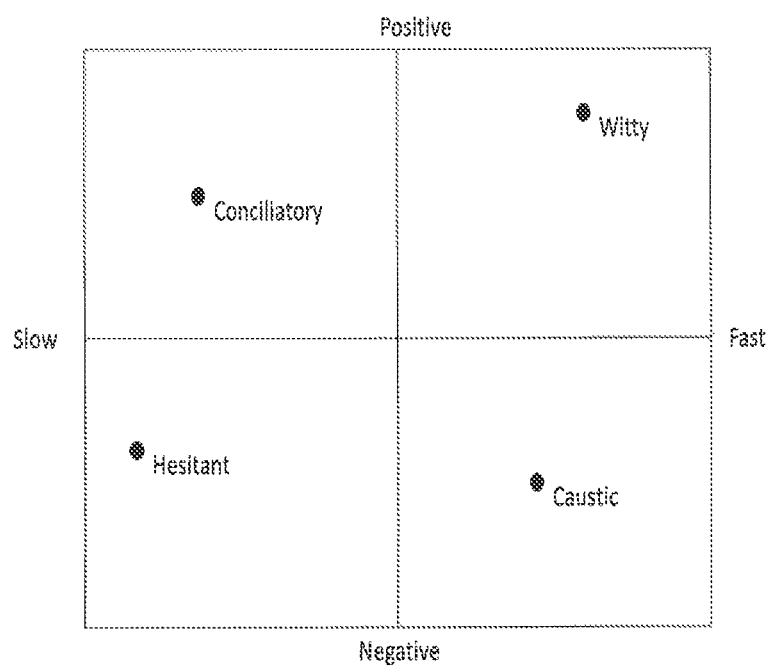
FIG. 4b shows an exemplary representation for type of user in psychometric analysis scenario in accordance with some embodiment of the present disclosure.

In another embodiment of FIG. 4*a*, consider a scenario of psychometric surveys to design behavioral change interventions. The scenario comprises the plurality of users as shown in the FIG. 4*a*. In an embodiment, the plurality of users may include, but are not limited to, psychometric analysts, human resource specialists, people managers and the like. Initially, the neural response analysis system 101 may provide one or more predefined neural stimulus to the plurality of users 403. The one or more predefined neural stimulus is displayed to the plurality of users 403 on the display system 409 as shown in FIG. 4*a*. For example, the neural stimulus is a video associated with five personality traits, namely, openness, conscientiousness, extroversion, agreeableness and neuroticism. The neural stimulus may be shown in view of the five personality traits. The plurality of users 403 may view the video stimulus. Based on the video stimulus, the neural dust sensors placed on the plurality of users 403 may detect the one or more neural responses of each of the plurality of users 403. In an embodiment, the neural dust sensors may identify pattern of response for similar stimulus, time taken to respond, response based on relationships and the like. In an embodiment, the neural response analysis system 101 may consider two aspects in the one or more neural responses, namely, speed and positivity. Based on the one or more responses, the plurality of users 403 may be placed in one of a category such as, conciliatory, witty, hesitant and caustic as shown in FIG. 4*b*. Further, based on the category, the type of response may be mapped with the five personality traits. Based on the mapping, the plurality of users 403 may be classified in one of the categories as "openness and agreeableness may lead to a personality of always end of being conciliatory", "openness and extroversion may lead to a personality of having quick response with witty comments often loaded with stern message", "extroversion and neuroticism may lead to a personality of dislike with caustic and derogatory comments". The details on type of users may be stored in the stimulus response mapping database 105. Whenever a set of users are required for execution of a task, the neural response analysis system 101 may provide the one or more neural stimulus to the plurality of users 403 in real time and receive the corresponding one or more neural responses. The one or more neural responses may be correlated with the details on the type of users from the stimulus response mapping database 105. Based on the correlation, the logical matrix may be created which may indicate the solution parameters such as, openness and extroversion and the like. The neural response analysis system 101 may create the solution model based on the logical matrix. In an embodiment, analysing the personalities of the users may result in design of a behavioural change mechanism. The mechanism may be, but not limited to, a campaign or training or legislation or any such medium of enforcement.

In another embodiment of the present disclosure, consider a scenario for behaviour change analysis. For example, a psychometric survey may be performed regarding a timeline suitable for watching cartoon program on television. Different types of users may be involved in the survey, such as, plurality of children, parents, child psychologist and the like. Each of the users may be exposed to a plurality of neural stimulus which are associated with cartoon. Based on the neural response of each of the users, the neural response system 101 may identify the biases of the users. The neural response analysis system 101 identifies that one or more children are biased towards watching cartoon for a longer time and parents may be biased towards not watching cartoon at all. The neural response of the child psychologist may include watching cartoons for a limited time period and showing other television programs to the children which may help in overall development of the children. In such case, the neural response analysis system 101 may create a solution model based on the neural response of the child psychologist, which is not biased. The solution model in this case may include one or more instructions. The instructions may comprise limiting the time period of watching cartoons and showing other television programs to the one or more children such as, sports, art, quiz competitions and the like which may catch the interest of the children and help in overall development of the children.

Figure 5:
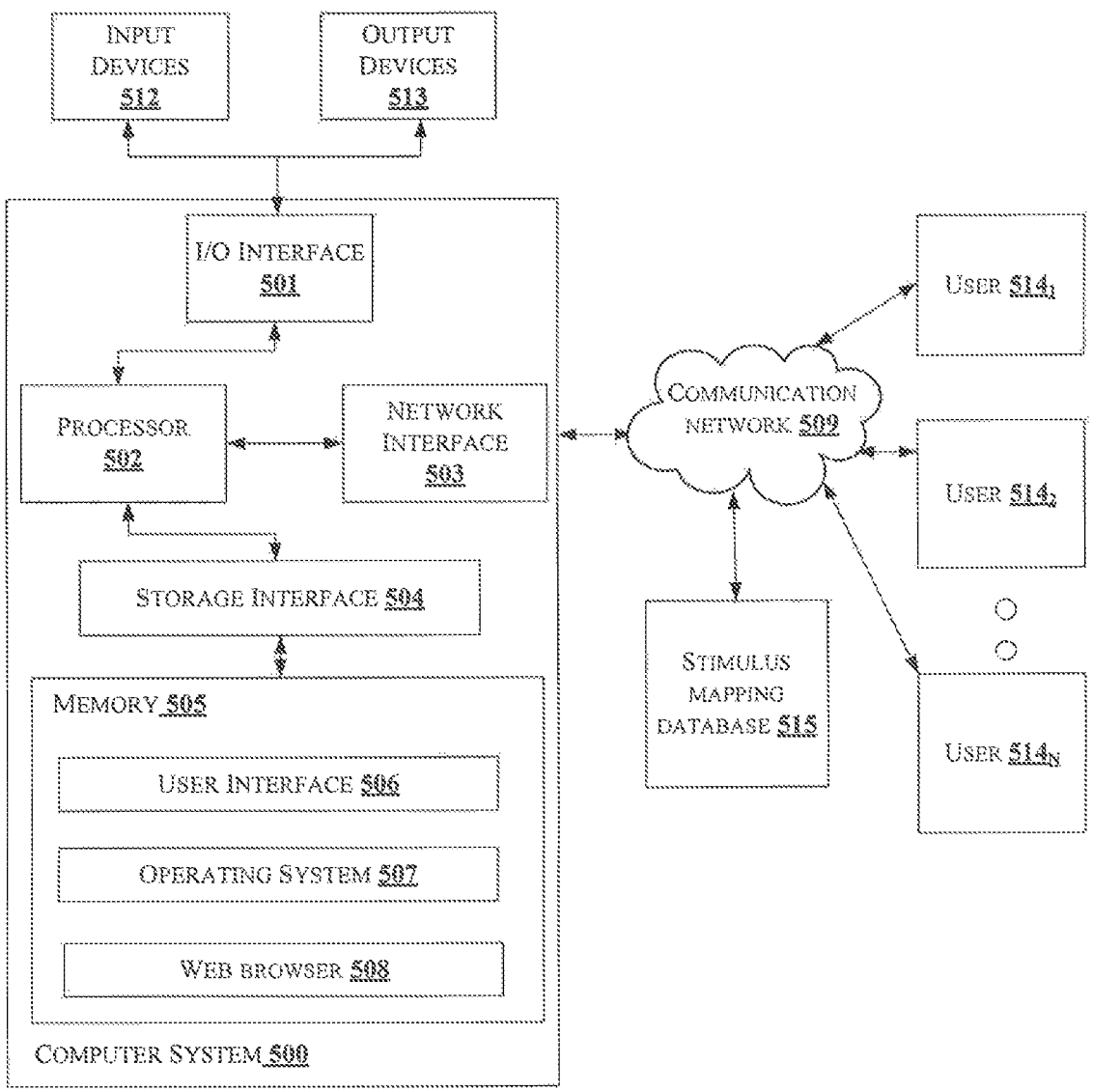
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 is used to implement the neural response analysis system 101. The computer system 500 may comprise a central processing unit ("CPU" or "processor") 502. The processor 502 may comprise at least one data processor for unbiased execution of tasks using neural response analysis of users. The processor 502 may include specialized processing units such as, integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 500 consists of a neural response analysis system 101. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/interne protocol (TCP/IP), token ring, IEEE 802.11a/b/g/n/x, etc. The communication network 509 may include, without limitation, a direct interconnection, local area network (LAN), wide area network (WAN), wireless network (e.g., using Wireless Application Protocol), the Internet, etc. Using the network interface 503 and the communication network 509, the computer system 500 may communicate with a user $514_1$, a user $514_2$, ... and a user $514_N$ (collectively referred as plurality of user 514) and a stimulus response mapping database 515. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 509 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as, serial advanced technology attachment (SATA), Integrated Drive Electronics (IDE), IEEE-1394, Universal Serial Bus (USB), fiber channel, Small Computer Systems interface (SCSI), etc. The memory drives may further include a drum, magnetic disc drive, magneto-optical drive, optical drive, Redundant Array of independent Discs (RAID), solid-state memory devices, solid-state drives, etc.

The memory 505 may store a collection of program or database components, including, without limitation, user interface 506, an operating system 507 etc. In some embodiments, computer system 500 may store user/application data 506, such as, the data, variables, records, etc., as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

The present disclosure helps in unbiased execution of tasks using neural response analysis.

An embodiment of the present disclosure assesses users more accurately and helps in creating/connecting appropriate users for effective collaborations.

An embodiment of the present disclosure provides execution of tasks without any biases and preferences of users.

An embodiment of the present disclosure identifies collaborative solutions which requires common understanding between the team members to execute tasks.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Neural response analysis system |
| 103 | Plurality of users |
| 105 | Stimulus response mapping database |
| 107 | Communication network |
| 109 | I/O interface |
| 111 | Memory |
| 113 | Processor |
| 200 | Data |
| 201 | Predefined neural stimulus data |
| 203 | Neural response data |
| 205 | Logical matrix |
| 207 | Solution model |
| 209 | User profile data |
| 211 | Unbiased instruction data |
| 213 | Other data |
| 215 | Modules |
| 217 | Neural stimulus providing module |
| 219 | Receiving module |

-continued

| Reference Number | Description |
| --- | --- |
| 221 | Correlating module |
| 223 | Solution model creating module |
| 227 | Instruction generation module |
| 229 | Training module |
| 231 | User profile classification module |
| 233 | Other modules |

What is claimed is:

1. A method for unbiased execution of tasks using neural response analysis of users, the method comprising:
providing, by a neural response analysis system (101), one or more predefined neural stimulus, to a plurality of users (103), wherein the one or more predefined neural stimulus are associated with a task to be assigned and resolved by the plurality of users (103);
receiving, by the neural response analysis system (101), one or more neural responses from the plurality of users (103) in view of the one or more predefined neural stimulus, wherein neural dust sensors placed on each of the plurality of users (103) detect the one or more neural responses;
correlating, by the neural response analysis system (101), the one or more neural responses of the plurality of users (103) with corresponding data associated with each of the plurality of users (103) stored in a stimulus response mapping database (105) to create a logical matrix (205) indicative of one or more solution parameters for resolving the task; and
creating, by the neural response analysis system (101), a solution model (207) to resolve the task based on the logical matrix (205), wherein the solution model (207) eliminates biases and preferences of the plurality of users (103) determined based on the correlation.

2. The method as claimed in claim 1, wherein the one or more predefined neural stimulus comprises audio-visual stimulus presented in form of situations, visual puzzles, mathematical problems and raw data.

3. The method as claimed in claim 1, wherein the one or more solution parameters comprises approach to the task, options considered, personal biases, cognitive style, and sensitivity to the predefined neural stimulus.

4. The method as claimed in claim 1, wherein the correlating comprises performing psychometric analysis and personal trait mapping of the plurality of users (103) based on social media behavior of the plurality of users (103).

5. The method as claimed in claim 1, wherein creating the solution model (207) comprises eliminating one or more neural responses associated with the one or more predefined neural stimulus, that are mapped to bias and preference information associated with the plurality of users (103).

6. The method as claimed in claim 1, further comprising subjecting, each of the plurality of users (103) to a plurality of neural stimulus during a training phase to identify biases and preferences of each of the plurality of users (103), and wherein biases and preferences information is stored in the stimulus response mapping database (105).

7. The method as claimed in claim 1 further comprising classifying user profiles in the stimulus response mapping database (105) based on patterns of behavior of each of the plurality of users (103).

8. The method as claimed in claim 1, wherein the biases of the plurality of users (103) are an outlook of the plurality of users (103) towards a situation with partial perspective leading to inaccurate judgement.

9. The method as claimed in claim 1 further comprising generating one or more instruction for unbiased execution of tasks based on the solution model (207).

10. The method as claimed in claim 1, wherein the one or more predefined neural stimulus to be displayed are selected based on a training phase, and wherein the displayed one or more predefined neural stimulus does not invoke bias of user in the one or more neural responses.

11. A neural response analysis system (101) for unbiased execution of tasks using neural response analysis of users, comprising:
a processor (113); and
a memory (111) communicatively coupled to the processor (113), wherein the memory (111) stores processor instructions, which, on execution, causes the processor (113) to:
provide one or more predefined neural stimulus, to a plurality of users (103), wherein the one or more predefined neural stimulus is associated with a task to be assigned and resolved by the plurality of users (103);
receive one or more neural responses from the plurality of users (103) in view of the one or more predefined neural stimulus, wherein neural dust sensors placed on each of the plurality of users (103) detect the one or more neural responses;
correlate the one or more neural responses of the plurality of users (103) with corresponding data associated with each of the plurality of users (103) stored in a stimulus response mapping database (105) to create a logical matrix (205) indicative of one or more solution parameters for resolving the task; and
create a solution model to resolve the task based on the logical matrix (205), wherein the solution model (207) eliminates biases and preferences of the plurality of users (103) determined based on the correlation.

12. The neural response analysis system (101) as claimed in claim 11, wherein the one or more predefined neural stimulus comprises audio-visual stimulus presented in form of situations, visual puzzles, mathematical problems and raw data.

13. The neural response analysis system (101) as claimed in claim 11, wherein the one or more solution parameters comprises approach to the task, options considered, personal biases, cognitive style, and sensitivity to the predefined neural stimulus.

14. The neural response analysis system (101) as claimed in claim 11, wherein the correlating comprises performing psychometric analysis and personal trait mapping of the plurality of users (103) based on social media behavior of the plurality of users (103).

15. The neural response analysis system (101) as claimed in claim 11, wherein creating the solution model (207) comprises eliminating one or more neural responses associated with the one or more predefined neural stimulus, that are mapped to bias and preference information associated with the plurality of users (103).

16. The neural response analysis system (101) as claimed in claim 11, wherein the processor (113) subjects each of the plurality of users (103) to a plurality of neural stimulus during a training phase to identify biases and preferences of each of the plurality of users (103), and wherein biases and preferences information is stored in the stimulus response mapping database (105).

17. The neural response analysis system (101) as claimed in claim 11, wherein the processor (113) classifies user profiles in the stimulus response mapping database (105) based on patterns of behavior of each of the plurality of users (103).

18. The neural response analysis system (101) as claimed in claim 11, wherein the biases of the plurality of users (103) are an outlook of the plurality of users (103) towards a situation with partial perspective leading to inaccurate judgement.

19. The neural response analysis system (101) as claimed in claim 11, wherein the processor (113) generates one or more instruction for unbiased execution of tasks based on the solution model (207).

20. The neural response analysis system (101) as claimed in claim 11, wherein the one or more predefined neural stimulus to be displayed are selected based on a training phase, and wherein the displayed one or more predefined neural stimulus does not invoke bias of user in the one or more neural responses.

21. A non-transitory computer readable medium including instruction stored thereon that when processed by at least one processor cause a neural response analysis system (101) to perform operation comprising:
providing one or more predefined neural stimulus, to a plurality of users (103), wherein the one or more predefined neural stimulus are associated with a task to be assigned and resolved by the plurality of users (103);
receiving one or more neural responses from the plurality of users (103) in view of the one or more predefined neural stimulus, wherein neural dust sensors placed on each of the plurality of users (103) detect the one or more neural responses;
correlating the one or more neural responses of the plurality of users (103) with corresponding data associated with each of the plurality of users (103) stored in a stimulus response mapping database (105) to create a logical matrix (205) indicative of one or more solution parameters for resolving the task; and
creating a solution model (207) to resolve the task based on the logical matrix (205), wherein the solution model (207) eliminates biases and preferences of the plurality of users (103) determined based on the correlation.

22. The medium as claimed in claim 21, wherein the one or more predefined neural stimulus comprises audio-visual stimulus presented in form of situations, visual puzzles, mathematical problems and raw data.

23. The medium as claimed in claim 21, wherein the one or more solution parameters comprises approach to the task, options considered, personal biases, cognitive style, and sensitivity to the predefined neural stimulus.

24. The medium as claimed in claim 21, wherein the correlating comprises performing psychometric analysis and personal trait mapping of the plurality of users (103) based on social media behavior of the plurality of users (103).

25. The medium as claimed in claim 21, wherein creating the solution model (207) comprises eliminating one or more neural responses associated with the one or more predefined neural stimulus, that are mapped to bias and preference information associated with the plurality of users (103).

26. The medium as claimed in claim 21, wherein the instruction causes the processor to subject each of the plurality of users (103) to a plurality of neural stimulus during a training phase to identify biases and preferences of each of the plurality of users (103), and wherein biases and preferences information is stored in the stimulus response mapping database (105).

27. The medium as claimed in claim 21, wherein the instruction causes the processor to classify user profiles in the stimulus response mapping database (105) based on patterns of behavior of each of the plurality of users (103).

28. The medium as claimed in claim 21, wherein the biases of the plurality of users (103) are an outlook of the plurality of users (103) towards a situation with partial perspective leading to inaccurate judgement.

29. The medium as claimed in claim 21 further comprising generating one or more instruction for unbiased execution of tasks based on the solution model (207).

30. The medium as claimed in claim 21, wherein the one or more predefined neural stimulus to be displayed are selected based on a training phase, and wherein the displayed one or more predefined neural stimulus does not invoke bias of user in the one or more neural responses.

* * * * *